(12) United States Patent
Park et al.

(10) Patent No.: US 8,868,330 B2
(45) Date of Patent: Oct. 21, 2014

(54) METHOD FOR ESTIMATING LOCATION AND APPARATUS USING THE SAME (75) Inventors: Yong-gook Park, Yongin-si (KR);
Ji-hyeon Kweon, Yongin-si (KR);
Hyun-jin Kim, Seoul (JP);
Myung-hyun Yoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 977 days.

(21) Appl. No.: 12/132,703

(22) Filed: Jun. 4, 2008

(65) Prior Publication Data

US 2009/0177399 A1 Jul. 9, 2009

(30) Foreign Application Priority Data

Jan. 7, 2008 (KR) .......................... 10-2008-0001940

(51) Int. Cl.
*G01C 21/00* (2006.01)
*G01S 19/48* (2010.01)

(52) U.S. Cl.
CPC ................. *G01C 21/00* (2013.01); *G01S 19/48* (2013.01)
USPC ........................................................ 701/408

(58) Field of Classification Search
USPC .................... 701/200–226, 30.1–30.9, 40–59, 701/300–302, 400–541
See application file for complete search history.

(56) References Cited

U.S. PATENT DOCUMENTS

| | | | | |
|---|---|---|---|---|
| 5,689,269 A * | 11/1997 | Norris | ................. | 342/357.31 |
| 6,232,917 B1 * | 5/2001 | Baumer et al. | ............ | 342/357.31 |
| 6,505,122 B1 * | 1/2003 | Vayanos | ................. | 701/469 |
| 6,574,557 B2 * | 6/2003 | Endo | ................. | 701/213 |
| 6,748,324 B2 * | 6/2004 | Patwari et al. | ................. | 701/300 |
| 7,706,814 B2 | 4/2010 | Sillasto et al. | | |
| 7,952,522 B2 * | 5/2011 | Hohl | ................. | 342/463 |
| 2001/0044697 A1 * | 11/2001 | Kageyama | ................. | 701/301 |
| 2003/0130793 A1 * | 7/2003 | Patwari et al. | ................. | 701/300 |
| 2005/0255865 A1 | 11/2005 | Sillasto et al. | | |
| 2008/0280564 A1 * | 11/2008 | Hoekstra et al. | ............. | 455/66.1 |
| 2013/0038490 A1 * | 2/2013 | Garcia | ................. | 342/451 |

FOREIGN PATENT DOCUMENTS

| | | |
|---|---|---|
| JP | 2000-161973 | 6/2000 |
| JP | 2004-179846 A | 6/2004 |
| JP | 2004-328538 A | 11/2004 |
| JP | 2005-86629 | 3/2005 |
| KR | 10-2007-0015615 A | 2/2007 |
| KR | 10-0686735 | 2/2007 |

* cited by examiner

*Primary Examiner* — Adam Levine
(74) *Attorney, Agent, or Firm* — Jefferson IP Law, LLP (57) ABSTRACT

A method for estimating location, and an apparatus using the same. The method for estimating location includes receiving information on the location of a plurality of external apparatuses from the plurality of external apparatuses; setting estimable areas for estimating an area wherein there is a possibility that the device is located based on the information on the location of the plurality of external apparatuses; and determining a predetermined area of the estimable areas to be an estimation area wherein there is the possibility that the device is located. If it is impossible to receive a GPS signal, the location information of a device is estimated using information on the location of an external apparatus communicable with the device.

19 Claims, 5 Drawing Sheets

METHOD FOR ESTIMATING LOCATION AND APPARATUS USING THE SAME

CROSS-REFERENCE TO RELATED APPLICATION

This application claims the benefit of Korean Patent Application No. 2008-1940, filed in the Korean Intellectual Property Office on Jan. 7, 2008, the disclosure of which is incorporated herein by reference.

BACKGROUND OF THE INVENTION

1. Field of the Invention

Aspects of the present invention relate to a method for estimating location and an apparatus using the same, and more particularly, to a method for estimating location using an external device, and an apparatus using the same.

2. Description of the Related Art

Mobile communication terminals such as mobile phones have become widely used. With the remarkable development of the function and efficiency of mobile communication terminals, the mobile communication terminals have various functions for transmitting and receiving e-mail, and for providing location information, in addition to basic communication functions.

There are various methods of providing information regarding the location of a terminal in a mobile communication system. First, there is a method for providing location information in which the distance between a terminal and a satellite is estimated by measuring the phase of a carrier wave signal transmitted from a Global Positioning System (GPS) satellite, or by estimating codes of a carrier wave signal. However, it is difficult to receive a GPS signal if there are obstacles intervening between the terminal and the GPS satellite, for example in a densely built-up area or indoors.

Second, there is a method of providing location information in which the distance between a mobile terminal and a base station is estimated using a time delay between signals transmitted from a plurality of base stations. However, the above method may provide inaccurate location information, since errors occur depending on the radius of a cell of a base station, with an error tolerance ranging from 500 m to many km.

Third, there is a wireless communication method for providing location information in which the location is recognized using a Diffuse infrared, ultrasonic, the radio frequency (RF), ultra wideband (UWB), and radio frequency identification (RFID) beacon. The method is appropriate for determining an indoor location, but a plurality of auxiliary devices are required. Thus, there is a need for a method of providing more efficient and accurate location information within an area in which it is not possible to receive a GPS signal or in which the GPS service is unavailable.

SUMMARY OF THE INVENTION

Aspects of the present invention relate to a method for more efficiently and accurately providing location information of a device within an area in which it is not possible to receive a GPS signal, and an apparatus using the same.

According to an aspect of the present invention, a method for estimating the location of a device is provided. The method comprises receiving location information regarding a plurality of external apparatuses from the plurality of external apparatuses; setting estimable areas to estimate an area in which the device may be located based on the location information regarding the plurality of external apparatuses; and determining a predetermined area of the estimable areas to be an estimation area in which the device may be located.

According to another aspect of the present invention, the determining further comprises determining an overlapping area of the estimable areas to be an estimation area within which the device is located.

According to another aspect of the present invention, the device performs short range wireless communication with the plurality of external apparatuses.

According to another aspect of the present invention, each of the plurality of external apparatuses receives a Global Positioning System (GPS) signal to acquire the location information.

According to another aspect of the present invention, the method further comprises displaying a map on which the estimation area is indicated.

According to another aspect of the present invention, the estimable area corresponds to a circle with a radius of a predetermined distance from the location of a corresponding one of the external apparatuses.

According to another aspect of the present invention, the predetermined distance is equal to either the distance between the device and the external apparatuses, or half of the distance within which the external apparatuses can communicate.

According to another aspect of the present invention, a device to estimate a location of the device is provided. The device comprises a communication module to receive location information regarding a plurality of external apparatuses from the plurality of external apparatuses; an estimable area setting unit to set estimable areas in which the device may be located based on the location information regarding the plurality of external apparatuses; and a location estimation unit to determine a predetermined area of the estimable areas to be an estimation area in which the device may be located.

According to another aspect of the present invention, the location estimation unit determines an overlapping area of the estimable areas to be an estimation area in which the device may be located.

According to another aspect of the present invention, the device is located within an area in which it is impossible to receive a GPS signal, or may not be capable of receiving the GPS signal.

According to another aspect of the present invention, the apparatus further comprises a display to display a map on which the estimation area is indicated.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below, in order to explain the present invention by referring to the figures.

Figure 1:
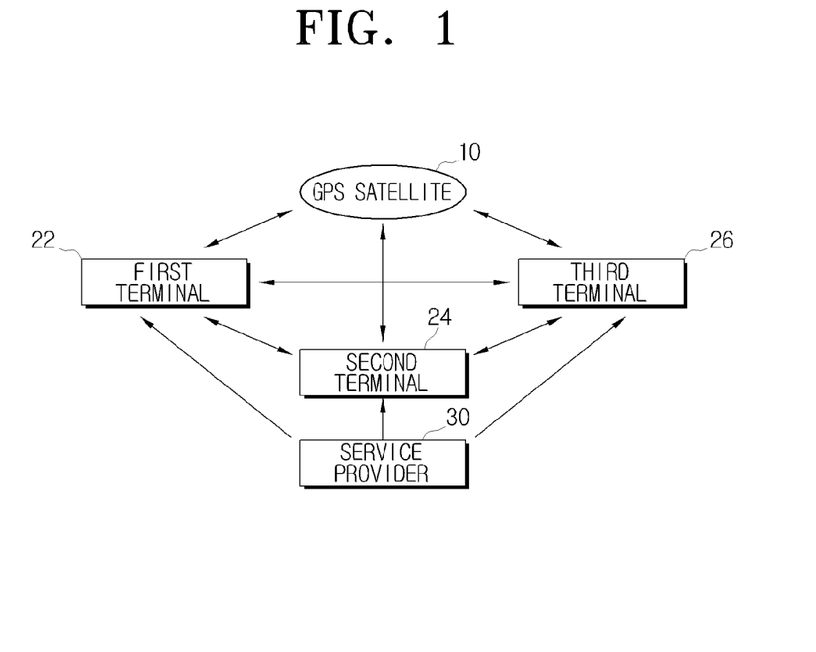
FIG. 1 is a diagram of a communication system that is capable of acquiring location information according to an embodiment of the present invention.

FIG. 1 shows a communication system that is capable of acquiring location information according to an embodiment of the present invention. The communication system may comprise, as shown in FIG. 1, a global positioning system (GPS) satellite 10; first, second, and third terminals 22, 24, and 26; and a service provider 30. The first, second, and third terminals 22, 24, and 26 communicate with the GPS satellite 10 to acquire location information. Each of the terminals 22, 24, and 26 communicates with the other terminals 22, 24, and 26 which are within an area where short range communication is possible, and receives a service from a service provider. If the second terminal 24 does not receive the location information from the GPS satellite 10, the second terminal 24 estimates the location information using the first and third terminals 22 and 26 adjacent to the second terminal 24, which will be explained below in detail.

Figure 2:
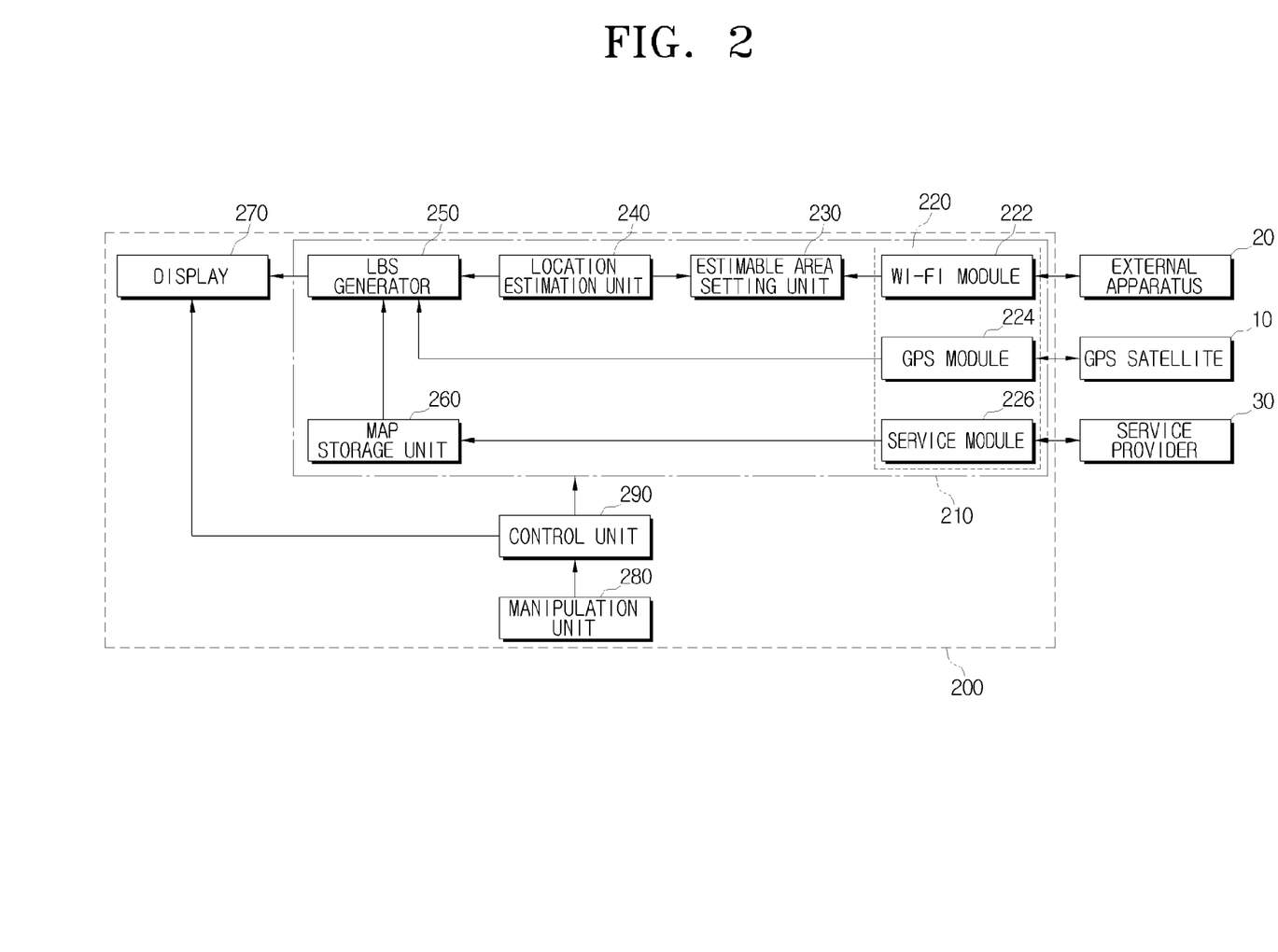
FIG. 2 is a block diagram of a terminal providing location information according to an embodiment of the present invention.

FIG. 2 shows a terminal 200 providing location information according to an embodiment of the present invention. The terminal 200 may comprise a location-based service (LBS) provider 210, a display 270, a manipulation unit 280, and a control unit 290. According to other aspects of the present invention, the terminal 200 may include additional and/or different units. Similarly, the functionality of two or more of the above units may be integrated into a single component.

The LBS provider 210 provides the location information regarding the terminal 200 under the control of the control unit 290, and comprises a communication unit 220, an estimable area setting unit 230, a location estimation unit 240, an LBS generator 250, and a map storage unit 260. The communication unit 220 communicates with an external source, and comprises a wireless fidelity (Wi-Fi) module 222, a GPS module 224, and a service module 226.

The Wi-Fi module 222 performs short range communication with the external apparatus 20, which is located in a short distance from the terminal 200. The Wi-Fi module 222 monitors the external apparatus 20 capable of performing short range communication, or receives information on the location of the external apparatus 20 and transmits the location information to the estimable area setting unit 230. The external apparatus 20 may communicate with the GPS satellite 10 to acquire the location information.

The GPS module 224 receives a GPS signal from at least one GPS satellite 10, computes the location of the terminal 200, and transmits information on the computed location to the LBS generator 250. The service module 226 receives service information from the service provider 30. The service provider 30 provides the terminal 200 with map information, product information, and advertising.

The estimable area setting unit 230 sets an estimable area that is capable of being estimated as to whether there is an external apparatus based on the information on the location for each external apparatus 20 received through the Wi-Fi module 222, and transmits the information on the set location to the location estimation unit 240. The estimable area setting unit 230 sets an area within a predetermined radius of the location of each external apparatus 20 as an estimable area. The predetermined radius may be, for example, half of the maximum distance within which the communication is possible via the wireless local area network (WLAN), or the distance between the terminal 200 and the external apparatus 20.

The location estimation unit 240 determines an estimation area within which the terminal 200 may be located, using data transmitted from the estimable area setting unit 230. The location estimation unit 240 may determine an overlapping area of the estimable areas to be an estimation area.

The LBS generator 250 retrieves from the map storage unit 260 a map including location information transmitted from the GPS module 224 or an estimation area transmitted from the location estimation unit 240. The LBS generator 250 indicates the location information or estimation area on the retrieved map, generates an LBS, and transmits the generated LBS to the display 270. The map storage unit 260 stores a map that can be updated by the service provider 30.

The control unit 290 controls the overall operation of the terminal 200. If a user inputs a command to display an LBS, the control unit 290 determines whether or not the GPS module 224 is capable of receiving a GPS signal. If the GPS module 224 does not receive the GPS signal, the control unit 290 controls the Wi-Fi module 222, the estimable area setting unit 230, and the location estimation unit 240, so that the Wi-Fi module 222 monitors the external apparatus 20, which performs short range communication, the estimable area setting unit 230 receives the information on the location of the external apparatus 20, and the location estimation unit 240 determines an estimation area.

Figure 3:
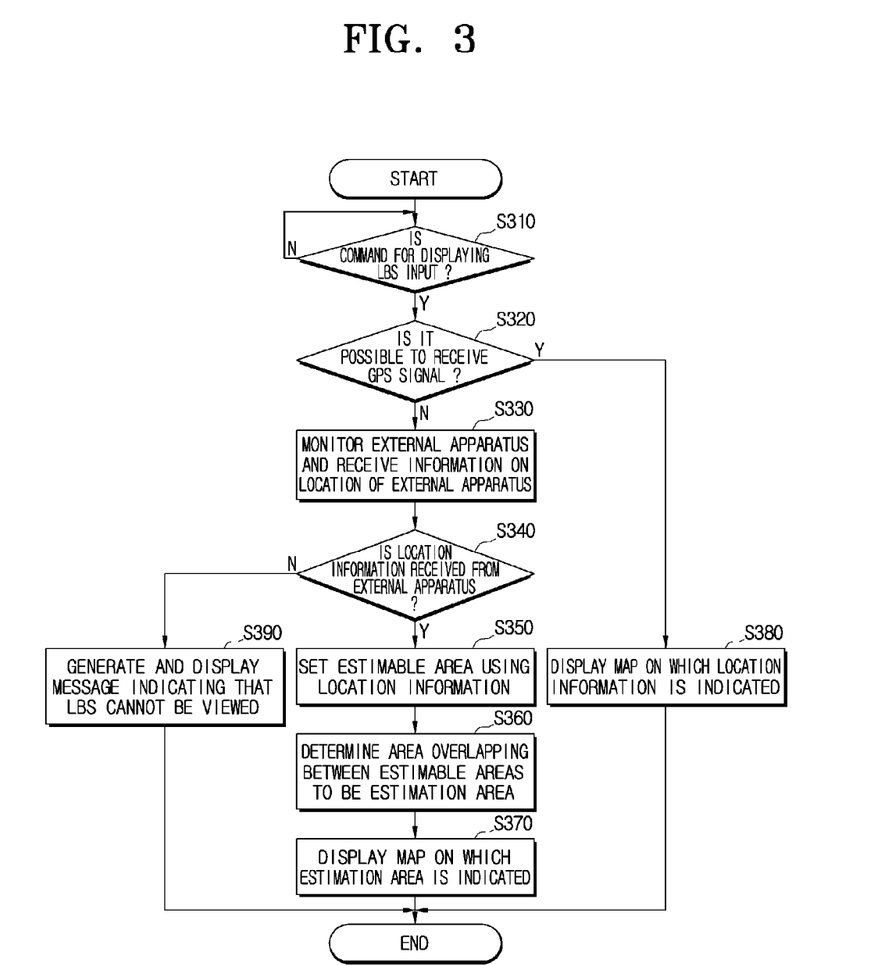
FIG. 3 is a flowchart of a process of receiving location information of an external apparatus and estimating location information of a terminal according to an embodiment of the present invention.

A process of estimating the location of the terminal 200 in an area within which it is not possible to receive a GPS signal will be explained in detail. FIG. 3 is a flowchart of a process of receiving location information regarding an external apparatus to estimate the location of a terminal according to an embodiment of the present invention.

The terminal 200 determines whether or not a command for displaying an LBS is input in operation S310. A user inputs the command for displaying an LBS using the manipulation unit 280, and then the control unit 290 determines that the command for displaying an LBS is input.

The terminal 200 determines whether it is possible to receive a GPS signal in operation S320. The GPS module 224 transmits a signal inquiring about its own location information to the GPS satellite 10, receives a GPS signal from the GPS satellite 10, and computes the location of the terminal 200. If the terminal 200 is in an area within which it is not possible for the terminal 200 to receive the GPS signal, the GPS module 24 transmits data indicating that the GPS signal cannot be received to the control unit 290. Accordingly, the control unit 290 determines that it is impossible to receive the GPS signal.

If it is possible to receive the GPS signal, the terminal 200 displays the map on which the location is indicated using, for example, a hand graphic, in operation S380. If the GPS module 224 receives the GPS signal, the GPS module 24 computes the location of the terminal 200 using the GPS signal, and transmits the information on the computed location to the LBS generator 250. The LBS generator 250 retrieves the map indicating the location from the map storage unit 260, generates an LBS in which the location is indicated using a hand graphic, and transmits the generated LBS to the display 270. The display 270 displays the map on which the location may be indicated using a hand graphic.

If it is impossible to receive the GPS signal, the terminal 200 monitors the external apparatus 20 that is capable of communicating via the WLAN, and thereby receives information on the location of the external apparatus 20 in operation S330. If it is not possible to receive the GPS signal, the control unit 290 controls the Wi-Fi module 222 to monitor the external apparatus 20, and to receive the information on the location of the external apparatus 20.

If the Wi-Fi module 222 does not receive the location information from the external apparatus 20 communicating via the WLAN, the control unit 290 generates a message indicating that the LBS cannot be viewed, and controls the display 270 to display the message in operation S390. If the Wi-Fi module 222 receives the information on the location of the external apparatus 20, the estimable area setting unit 230 sets an estimable area using the information on the location of the external apparatus 20, and transmits information on the set area to the location estimation unit 240 in operation S350.

Specifically, the Wi-Fi module 222 may set a circle with a radius equal to half of the maximum distance within which communication is possible via the WLAN as an estimable area. When there are a plurality of external apparatuses 20 having location information, the estimable area is the combined area (intersection) of overlapping circles each having a radius equal to half of the maximum distance within which communication is possible via the WLAM.

For example, if a WLAN module receives the location information from n external apparatuses, the estimable area (K) $L^\delta_k(x,y)$ of the external apparatus (K) of the n external apparatuses is calculated using Formula 1.

$$L_k^\delta(x,y)=(x-L_k(x))^2+(y-L_k(y))^2 \le \delta^2 \qquad \text{[Formula 1]}$$

where $L_k(x)$, $L_k(y)$=longitude and latitude coordinates of the external apparatus (K)

δ=half of the maximum distance within which the communication is possible via the WLAN The combined estimable area $L^e(x,y)$ of n external apparatuses is calculated using Formula 2.

$$L^e(x,y)=L_1^\delta(x,y) \cup L_2^\delta(x,y) \ldots \cup L_n^\delta(x,y) \qquad \text{[Formula 2]}$$

The location estimation unit 240 determines an area overlapping between the estimable areas to be an estimation area in operation S360. If only one external apparatus 20 having location information is provided, the estimable area is identical to the estimation area. If there are a plurality of external apparatuses 20 having location information, the estimation area L(x,y) corresponds to an area overlapping between the estimable areas, as represented in Formula 3.

$$L(x,y)=L_1^\delta(x,y) \cap L_2^\delta(x,y) \ldots \cap L_n^\delta(x,y) \qquad \text{[Formula 3]}$$

The location estimation unit 240 determines the estimation area, and transmits information on the determined area to the LBS generator 250. The LBS generator 250 retrieves a map including the estimation area from the map storage unit 260, indicates the estimation area on the map, and transmits the map to the display 270. The display 270 displays the map on which the estimation area is indicated using, for example, a hand graphic S370.

Figure 4A:
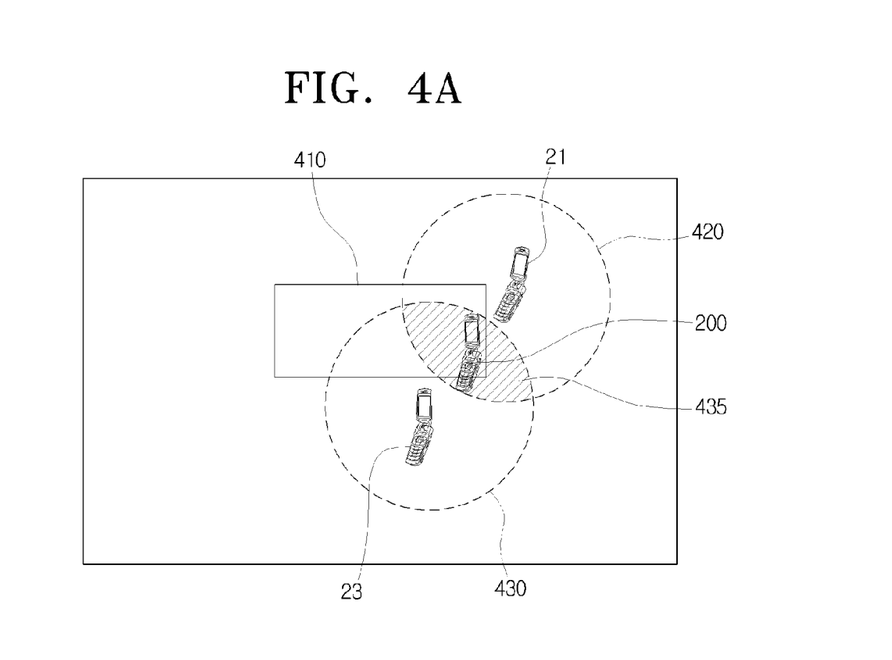
FIGS. 4A and 4B are diagrams of a process of determining an estimation area from an estimable area according to an embodiment of the present invention.
Figure 4B:
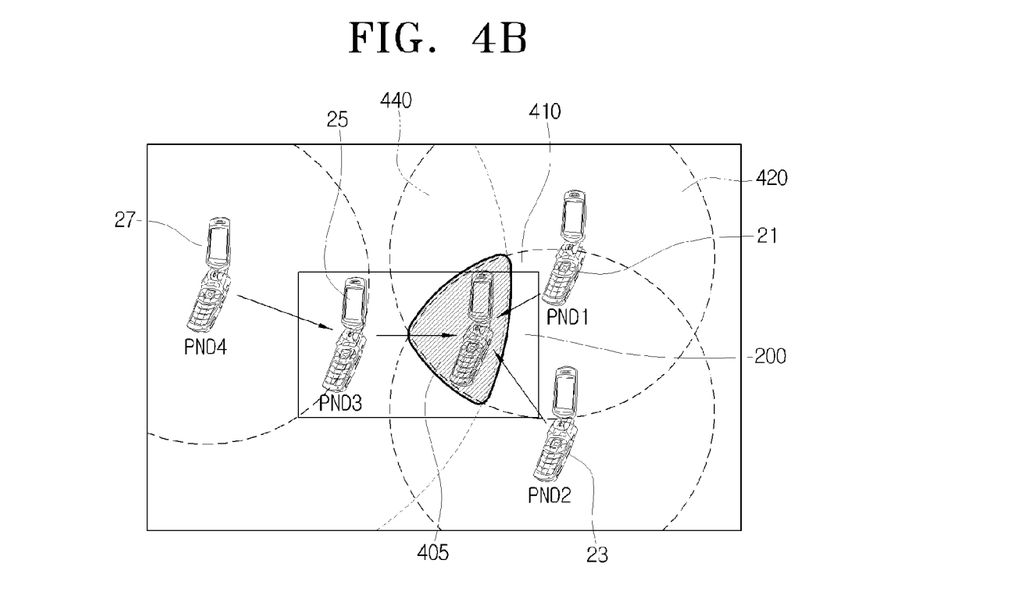

FIGS. 4A and 4B show a process of determining an estimation area using an estimable area according to an embodiment of the present invention. Referring to FIG. 4A, the terminal 200 is within an area 410 in which it is not possible to receive a GPS signal, and communicates with the first and second external apparatuses 21 and 23, each having location information, via the WLAN. The terminal 200 receives the location information from the first and second external apparatuses 21 and 23 in order to provide an LBS. The terminal 200 sets first and second estimable areas 420 and 430 using the location information, and determines an overlapping area 435 between the first and second estimable areas 420 and 430 to be the estimation area.

The terminal 200 in an area in which it is not possible to receive a GPS signal communicates with an external apparatus to provide a GPS, and estimates the location of the terminal 200 using the information on the location of the external apparatus 20, thereby estimating the location of the terminal 200 without requiring an auxiliary device. The process of estimating location according to aspects of the present invention has a lower error tolerance than a mobile communication method via a base station of a communication network. The more external apparatuses 20 provided adjacent to the terminal 200, the more accurately the process according to aspects of the present invention estimates the location.

FIG. 4B shows a process of setting an estimable area to determine an estimation area according to another embodiment of the present invention. Referring to FIG. 4B, the terminal 200 and the third external apparatus 25 are located within an area 410 in which it is not possible to receive a GPS signal, and the first, second, and fourth external apparatuses 21, 23, and 27 are located within an area in which it is possible to receive a GPS signal. The terminal 200 is communicable with the first, second, and third external apparatuses 21, 23, and 25, and the third external apparatus 25 is communicable with the fourth external apparatus 27. The terminal 200 receives location information from the first external apparatus 21 and the second external apparatus 23, and sets the first and second estimable areas 420 and 430 based on the first and second external apparatuses 21 and 23. However, the terminal 200 receives the information on the location of the fourth external apparatus 27 through the third external apparatus 25, and sets the fourth estimable area 440 based on the received location information. The fourth estimable area 440 may be a circle with a radius equal to the distance between the fourth external apparatus 27 and the terminal 200. An overlapping area 445 of the first, second, and fourth estimable areas 420, 430, and 440 is determined to be the estimation area of the terminal 200.

Figure 5:
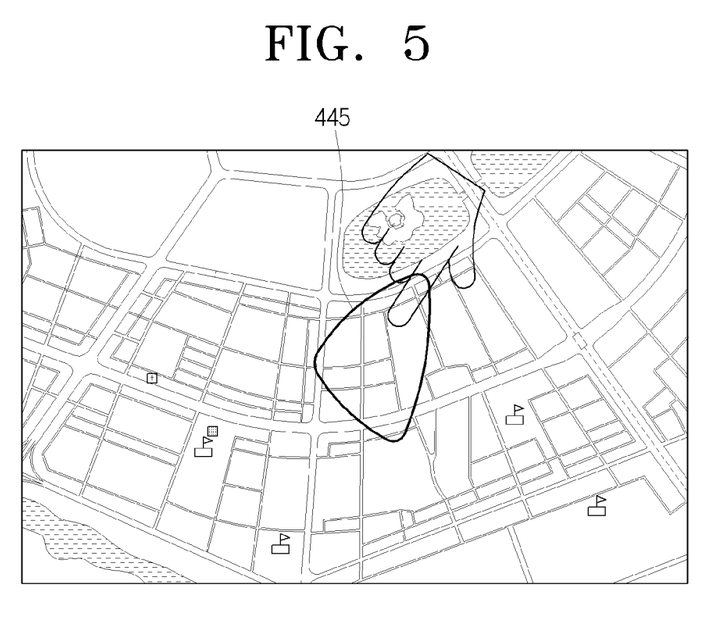
FIG. 5 illustrates a map on which an estimation area is indicated according to an embodiment of the present invention.

FIG. 5 shows a map on which an estimation area is indicated according to an embodiment of the present invention. The LBS generator 250 retrieves a map including the estimation area 445 from the map storage unit 260, indicates the estimation area 445 on the retrieved map, and transmits the map to the display 270. The display 270 displays the map on which the estimation area 445 is indicated using a hand graphic as shown in FIG. 5. Accordingly, a user can find his or her own location.

While the information on the location of a terminal communicable with another terminal is used to estimate the information on the location of the other terminal as described above, this should not be considered to be limiting. Aspects of the present invention may also be applied to any other device having location information.

WLAN communication is disclosed as one example of short range wireless communication as described above, but this should not be considered to be limiting. The method of short range wireless communication may be Bluetooth, a radio frequency (RF), wireless broadband (Wibro), code division multiple access (CDMA), trunked radio system (TRS), and worldwide interoperability for microwave access (Wimax) systems, instead of WLAN communication, etc.

The terminal 200 as described above selectively carries out GPS communication or short range communication to provide an LBS, but this should not be considered to be limiting. Aspects of the present invention may be applied not only when the terminal 200 is located within an area in which it is impossible to receive a GPS signal, but also when the function for receiving a GPS signal is not provided. Similarly, although described with respect to the GPS system, this is not limiting, and GPS as used herein should be understood to refer to any global navigation satellite system, such as the Galileo service being developed by the European Union and the European Space Agency.

When a user inputs a command for displaying an LBS, the location information or estimation area is determined. However, this is merely an exemplary embodiment of the present invention. The terminal 200 may also be implemented to determine the location information or estimation area at a predetermined time interval irrespective of a user's command.

As described above, according to aspects of the present invention, when it is impossible to receive the GPS signal, the information on the location of a device may be estimated using the information on the location of an external apparatus which is capable of communicating with the device.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for providing a Location Based Service (LBS), the method comprising:
   wirelessly receiving, by a mobile device that is incapable of receiving a Global Positioning System (GPS) signal or that is located within an area in which it is impossible to receive the GPS signal, geographic location information comprising respective geographic locations of each of a plurality of external apparatuses from the plurality of external apparatuses;
   setting, by the mobile device, estimable areas to estimate areas in which the mobile device may be located based on the corresponding geographic locations of the plurality of external apparatuses;
   determining, by the mobile device, a predetermined area of the estimable areas to be an estimation area in which the mobile device is located, and
   providing the LBS to the mobile device only when the mobile device is located at a predetermined location for the service.

2. The method according to claim 1, wherein the determining of the estimation area comprises:
   determining, by the mobile device, an overlapping area of the estimable areas to be the estimation area in which the mobile device is located.

3. The method according to claim 1, wherein the mobile device performs short range wireless communication with the plurality of external apparatuses.

4. The method according to claim 1, wherein each of the plurality of external apparatuses receives a GPS signal to acquire the corresponding geographic location information.

5. The method according to claim 1, further comprising:
   displaying a map on which the estimation area is indicated.

6. The method according to claim 1, wherein the estimable areas each correspond to a circle with a radius of a predetermined distance from the geographic location of a corresponding one of the plurality of external apparatuses.

7. The method according to claim 6, wherein the predetermined distance is equal to either a distance between the mobile device and the corresponding one of the plurality of external apparatuses, or half of a distance within which the corresponding one of the plurality of external apparatuses is communicable.

8. A non-transitory computer readable medium comprising instructions that, when executed by a mobile device, cause the mobile device to perform the method according to claim 1.

9. A mobile apparatus to estimate a location of the mobile apparatus, the mobile apparatus comprising:
   at least one wireless transceiver to wirelessly receive geographic location information, when the mobile apparatus is incapable of receiving a Global Positioning System (GPS) signal or is located within an area in which it is impossible to receive the GPS signal, the geographic location information comprising respective geographic locations of each of a plurality of external apparatuses from the plurality of external apparatuses;
   a processor to set estimable areas in which the mobile apparatus may be located based on the geographic locations of the plurality of external apparatuses, and to determine a predetermined area of the estimable areas to be an estimation area in which the mobile apparatus may be located.

10. The mobile apparatus according to claim 9, wherein the processor determines an overlapping area of the estimable areas to be an estimation area in which the mobile apparatus may be located.

11. The mobile apparatus according to claim 9, wherein the mobile apparatus performs short range wireless communication with the plurality of external apparatuses through the at least one wireless transceiver.

12. The mobile apparatus according to claim 9, further comprising:
   a display to display a map on which the estimation area is indicated.

13. The mobile apparatus according to claim 9, wherein the estimable area corresponds to a circle with a radius of a predetermined distance from the geographic location of a corresponding one of the plurality of external apparatuses.

14. The mobile apparatus according to claim 13, wherein the predetermined distance is equal to either a distance between the mobile apparatus and the corresponding external apparatus or half of a distance within which the corresponding external apparatus can communicate.

15. A mobile apparatus comprising:
   at least one wireless transceiver to wirelessly communicate with a plurality of external devices and a Global Positioning System (GPS) service; and a processor for providing a Location Based Service (LBS) to estimate an area in which the mobile apparatus is located based on geographic location information comprising respective geographic locations of each of the plurality of external devices received from the plurality of external devices, when the mobile apparatus determines that the GPS service is unavailable or that a GPS signal cannot be received, wherein the LBS comprises a service that is provided to the mobile device only when the mobile device is located at a predetermined location for the service.

16. The mobile apparatus according to claim 15, wherein the processor further
determines an estimable area in which the mobile apparatus may be located, based on the geographic locations of the plurality of external devices, and
determines a subset of the estimable area as the estimated area in which the mobile apparatus is located.

17. The mobile apparatus according to claim 15, wherein the processor estimates the area in which the mobile apparatus is located at predetermined time intervals.

18. The mobile apparatus according to claim 15, wherein:
the mobile apparatus communicates with a first one of the plurality of external devices via relay through a second one of the plurality of external devices; and
the second one of the plurality of external devices cannot receive a GPS signal, or has determined that the GPS service is not available to the second one of the plurality of external devices.

19. The mobile apparatus according to claim 15, wherein the processor estimates the area in which the mobile apparatus is located when a user requests a location based service.

* * * * *